United States Patent [19]

Takahashi

[11] 4,071,582

[45] Jan. 31, 1978

[54] METHOD OF POLYMERIZING VINYL HALIDE WITH OLEFIN POLYMERS AND COPOLYMERS AND COMPOSITIONS THEREOF

[75] Inventor: Akio Takahashi, Amherst, N.Y.

[73] Assignee: Hooker Chemicals & Plastics Corporation, Niagara Falls, N.Y.

[21] Appl. No.: 674,202

[22] Filed: Apr. 5, 1976

Related U.S. Application Data

[63] Continuation-in-part of Ser. No. 427,895, Dec. 26, 1973, which is a continuation-in-part of Ser. No. 251,099, May 8, 1972, abandoned.

[51] Int. Cl.$^2$ .......................................... C08F 279/00
[52] U.S. Cl. ................................................. 260/878 R
[58] Field of Search ..................................... 260/878 R

[56] References Cited

U.S. PATENT DOCUMENTS

| | | | |
|---|---|---|---|
| 3,408,424 | 10/1968 | Barkhuff | 260/878 R |
| 3,487,129 | 12/1969 | Platzer | 260/878 R |
| 3,489,822 | 1/1970 | Witt et al. | 260/878 |
| 3,522,227 | 2/1971 | Thomas | 260/878 R |
| 3,544,660 | 12/1970 | Thomas et al. | 260/878 R |
| 3,557,253 | 1/1971 | Sugimoto et al. | 260/878 R |
| 3,562,359 | 2/1971 | Gelman | 260/879 |
| 3,580,975 | 5/1971 | Rademacher | 260/878 R |
| 3,607,980 | 9/1971 | Thomas et al. | 260/878 R |
| 3,639,512 | 2/1972 | Sugimoto et al. | 260/878 |
| 3,676,528 | 7/1972 | Severini et al. | 260/878 R |
| 3,683,051 | 8/1972 | Chatelain | 260/878 R |
| 3,726,946 | 4/1973 | Severini et al. | 260/878 |
| 3,761,542 | 9/1973 | Koskaka et al. | 260/878 R |
| 3,789,083 | 1/1974 | Dumoulin et al. | 260/878 R |
| 3,790,644 | 2/1974 | Obsomer | 260/878 R X |
| 3,812,204 | 5/1974 | Natta et al. | 260/878 R |
| 3,891,720 | 6/1975 | Severini et al. | 260/878 R |
| 3,966,844 | 6/1976 | Arvighetti et al. | 260/278 R |
| 4,021,508 | 5/1977 | Nakanishi et al. | 260/878 R X |

FOREIGN PATENT DOCUMENTS

| | | | |
|---|---|---|---|
| 1,060,118 | 2/1967 | United Kingdom | 260/878 |
| 852,042 | 10/1960 | United Kingdom | 260/878 R |

OTHER PUBLICATIONS

Advances in Chemistry #99, p. 260, (1971), by Severini et al.

*Primary Examiner*—William F. Hamrock
*Attorney, Agent, or Firm*—Peter F. Casella; James F. Mudd; David A. Stein

[57] ABSTRACT

An improved vinyl halide or vinyl halide copolymer containing up to 50 percent of a copolymer can be obtained by polymerizing in contact with an aliphatic hydrocarbon olefin homopolymer, copolymer or terpolymer in a process of bulk polymerizing comprising single stage or two-stage bulk polymerization wherein high speed agitation is used during the first stage and low speed agitation is used in the second stage. By polymerizing in the presence of the olefin polymer or copolymer, reduced particle size, reduced lump formation, and lower melt viscosity and improved impact strength can be obtained in the resin product. Small amounts of the olefin polymer or copolymer are effective in providing particle size control, reducing lump formation and eliminating scale build-up. Larger amounts of olefin polymer increase impact strength, reduce melt viscosity and provide excellent mold release properties in the final product.

28 Claims, No Drawings

METHOD OF POLYMERIZING VINYL HALIDE WITH OLEFIN POLYMERS AND COPOLYMERS AND COMPOSITIONS THEREOF

CROSS REFERENCE TO RELATED APPLICATIONS

This is a continuation-in-part of co-pending application Ser. No. 427,895 filed Dec. 26, 1973 which is a continuation-in-part application Ser. No. 251,099, filed May 8, 1972, now abandoned.

BACKGROUND OF THE INVENTION

Field of the Invention

This invention relates to the preparation of homopolymers and copolymers of vinyl halide such as vinyl chloride having reduced grain size and melt viscosity, improved impact strength and easy processability. The polymers are useful in the production of films, coatings, and molded articles. Scale build-up is eliminated during bulk polymerization of the polymers of the invention.

The polymers of the invention have impact strength improved by as much as a factor of 20 over the unmodified prior art polymers. Additionally, the polymers of the invention can be more easily processed to produce molded articles, since the polymers of the invention have excellent mold release properties allowing molds to be made using the polymer of the invention without the usual additional lubricant components or the use of mold release agents which are used on the mold itself in order to provide a surface to which the polymer will not stick readily.

Fine grain homopolymers and copolymers can also be obtained by the process of the invention having narrow grain size distribution and 10 to 30 micron average grain size range, thus permitting the polymers of the invention to be used in applications where previously bulk polymerized polymers were unsuited because of their excessive grain size and wide grain size distribution. In prior bulk polymerization methods, polymers are produced having average grain sizes in the range of about 80 to about 150 microns. More costly suspension polymerization processes are presently utilized to produce fine grain size polymers.

Polyvinyl chloride has been produced by bulk or mass polymerization methods in the absence of solvents and diluents. The polymer produced has an irregular shape which may vary from minute globular particles to irregular, non-globular masses. The efficiency of the bulk or mass polymerization processes of the prior art is reduced by the unwanted production of "scale" which is defined as a resinous build-up or deposit on the surface of the reactor and on the agitator. The scale is a very hard fused resin and is generally produced in an amount between 1 and 5% of the total resin yield. Since the scale so produced cannot be used commercially, and additionally, it is necessary to expend time and effort to remove it from the equipment, such scale production detracts from the efficiency of the process. The term "lump" can be defined as resinous material formed during the bulk polymerization characterized as being a soft agglomerate. Lump formation in the usual bulk polymerization process amounts to between 3 to 4% of the total product. Although the lump resin can be used after grinding to produce small particle size resinous material, it would be better if this could be eliminated. In British Pat. No. 1,047,489 and U.S. Pat. No. 3,522,227, both of which are hereby incorporated by reference, there are described a method of polymerization in mass in two steps which produces an improvement in regularity of granular size and shape. The process is more controllable and the product more uniform than can be obtained by other methods of bulk polymerization. In this process, the monomer is polymerized in a first stage to about 7 to about 15 percent conversion, preferably, about 8 to about 10 percent conversion in a reactor in which provision is made for high speed, high shear agitation. At the end of the first stage polymerization, the mass is transferred to a second reactor and further polymerized using slow speed agitation to an appropriate end point (70 to 85 percent conversion in many cases). It is an object of this invention to produce polymers having a small particle size which remain substantially unsolvated when placed in contact with primary type plasticizers for vinyl chloride resins.

Vinyl halide polymers of the prior art have been prepared in a wide variety of molecular weights; those of high molecular weight generally having better physical properties such as hardness and strength than those of lower molecular weight. The higher the molecular weight, however, the more difficult it is to process the polymer into a final product form.

In the subsequent processing of vinyl halide polymers, such as milling and extruding, higher molecular weight polymers require the use of higher shear force and/or higher temperatures to fluidize the polymer in comparison to lower molecular weight materials. The increased shear force and/or increased temperature required increases the internal temperature of the polymer and tends to degrade the vinyl halide polymers. In addition, the increased shear force necessary to process the polymers adds to the cost of processing the polymer. It is an object of this invention to produce easy processing polymers having greater fluidity at elevated temperatures and reduced resistance to shear force without sacrificing other physical properties. Another object of the invention is to produce a polymer having excellent mold release properties. Conventional lubricants and mold releasing agents such as polyethylene wax, silicone resin, fluorinated resins, etc., which are added to resins of the prior art prior to molding, can be eliminated when the polymers of the invention are used.

Mechanical blends of aliphatic hydrocarbon olefin polymers and polyvinyl halide have been prepared in an effort to produce easy processing polyvinyl halide polymers. These mixtures are incompatible and unsatisfactory. Graft copolymers of polyolefins such as polyethylene, and vinyl chloride have been prepared in the presence of a free radical initiating compound using aqueous methods of polymerization, e.g. suspension polymerization, in an effort to increase the flexibility at low temperatures of polyvinyl halide polymers and copolymers as well as improve their impact resistance. These graft copolymers overcome the incompatibility of physical blends of polyolefins and polyvinyl chloride but these methods of producing graft copolymers are expensive and time consuming, and aqueous polymerization of vinyl halides is well-recognized in the art as being chemically distinctive from bulk vinyl halide polymerization in both process and product. It is a further object of the present invention to produce graft copolymers by the bulk polymerization of a polyolefin dissolved in a vinyl halide monomer. The process of the invention provides graft copolymers having unexpectedly large improvements in impact resistance for the amount of polyolefin polymer or terpolymer used and having a distinctive difference in the kind of polymer breakage which occurs on impact.

It is an additional object of the present invention to produce a vinyl halide polymer by a bulk polymerization process in which the tendence of the polymer to form scale deposits on the equipment is greatly reduced or eliminated by polymerization in the presence of an olefin polymer soluble or partially soluble in vinyl halide.

SUMMARY OF THE INVENTION

This invention relates to a method of obtaining a small particle size vinyl halide homopolymer or copolymer such as polyvinyl chloride by a liquid phase process involving a single stage or a two-stage bulk process of polymerization using high speed, high shear agitation during a first stage and low speed, low shear agitation during the second stage. During the first stage polymerization, the monomer or monomers are present in contact with a polymer of an aliphatic hydrocarbon olefin which is soluble, partially soluble or dispersible in the monomer or monomers under conditions of polymerization temperature and pressure. A reduction in particle size of the polymerized product can thus be obtained, in which the average grain size is about 10 to about 30 microns.

In another aspect of this invention, an impact resistance vinyl halide homopolymer or copolymer such as polyvinyl chloride can be obtained without sacrificing other physical properties by the bulk polymerization of a vinyl halide monomer or comonomers in contact with a polymer of an aliphatic hydrocarbon olefin which is soluble, partially soluble or dispersible under conditions of polymerization temperature and pressure in the monomer or comonomers used. An unexpected improvement in impact strength can be obtained by bulk polymerization methods disclosed as compared to suspension processes known in the prior art.

In another aspect, this invention relates to a method of obtaining easy processing vinyl halide homopolymers and copolymers by a bulk polymerization process in which scale deposits on the polymerization equipment are substantially reduced or eliminated by the incorporation of a polyolefin which is soluble, partially soluble or dispersible in the monomer or monomers used.

Such polymers have been found to possess excellent mold release properties as the result of the chemically combined polyolefin polymer contained therein. Thus, it has been found that conventional mold release agents either applied to the mold itself or incorporated into the polymeric compound to be molded can be eliminated.

DESCRIPTION OF THE PREFERRED EMBODIMENTS

The present invention in one aspect is directed to a process for preparing small particle size vinyl halide polymers by a single stage or a two-stage bulk polymerization process by the polymerization of a reactant composition comprising at least 80 percent vinyl halide in the presence of from about 0.05 percent to about 20 percent, preferably about 0.1 percent to about 10 percent, by weight of the olefin polymer based upon the total weight of monomer. The aliphatic hydrocarbon olefin polymer which is soluble, partially soluble or dispersible in the monomer composition can be a terpolymer derived from olefin monomers having 2 to 8 carbon atoms in combination with a polyene monomer, preferably a diene monomer, the resulting polymer having available unsaturation. The polyolefins used are characterized by being soluble, partially soluble or dispersible at polymerization temperature and pressure in vinyl chloride monomer and, if a homopolymer or copolymer also, derived from a monomer having 2 to 8 carbon atoms. To facilitate solution or dispersion of the polyolefin in the monomer temperatures ranging from 30 to about 75 degrees centigrade are conveniently used in mixing the polyolefin and monomer. In addition, if desired, a nitrogen atmosphere at a pressure of about 1 to 2 atmospheres maybe used during the polymerization of vinyl chloride according to the invention. The vapor pressure of vinyl chloride in the reactor during polymerization is significantly reduced by the dissolved polyolefin so that the additional nitrogen pressure used increases the total pressure only a small amount as compared to a polymerization conducted without th use of dissolved polyolefin. In this way, the increased pressure serves to prevent deposition of the polyolefin polymer on the reactor wall.

In another aspect, the invention is directed to a process for preparing vinyl halide polymers having improved impact resistance properties without sacrificing other physical properties. More particularly, the present invention relates to vinyl halide polymers prepared by bulk polymerizing in a single stage or two-stage process a monomer composition comprising at least 50 percent of a vinyl halide, preferably at least 80 percent, in the presence of from about 1 percent to about 20 percent preferably about 1 percent to about 10 percent by weight of the olefin polymer which can have available unsaturation as the result of the copolymerization or terpolymerization of the olefin or olefins with a polyene monomer, e.g. a diene monomer or triene monomer, which can be conjugated but is preferably nonconjugated. The proportion of olefin polymer is based upon the total weight of the monomer used. Improved impact strength vinyl halide polymers can be prepared in the bulk polymerization process, either by a two-stage method in which high speed, high shear agitation is used during a first stage, and low speed, low shear agitation is used in a second stage, or, alternately, a single stage reaction vessel can be used.

In yet another aspect, the present invention is directed to a process for preparing small particle size, easy processing vinyl halide polymers by a single or two-stage bulk polymerization process in which scale formation on the equipment used for the polymerization is substantially reduced or eliminated by the incorporation of a soluble, partially soluble or dispersible polyolefin polymer in the vinyl halide monomer in the amount of from about 0.05 percent to about 20 percent by weight, preferably about 0.1 percent to about 10 percent based upon the total weight of monomer.

It has now been unexpectedly found that vinyl halide polymers of medium and high molecular weight can be prepared which show improved processing characteristics as the result of the ability of the polymer to flux or flow during processing, for instance, during a molding operation, without sacrificing other physical properties such as strength and, at the same time, improving the impact resistance of the polymer. All these characteristics can be obtained in addition to the characteristic of reduced particle size over the usual 80 to 160 micron particle size polymers of vinyl halide commonly produced by the best prior art bulk polymerization processes when the bulk polymerization process is either a two-stage process as has been described in the prior art, such as in U.S. Pat. No. 3,522,227, or a single stage bulk polymerization process.

The physical properties of a graft polymerization reaction product such as graft polymerized vinyl chloride is greatly influenced by the degree of interphase compatibilization. By this is meant the phase distribution of the rigid or brittle homopolymer or copolymer continuous phase and the tough rubbery disperse phase of the trunk polymer. During the bulk polymerization of this invention, the compatibilization or phase distribution takes place so that the physical properties of the product obtained by the above polymerization process are fixed and do not change substantially during further processing. The reaction product exhibits unexpectedly high impact strength for the amount of polyolefin or polyolefin copolymer used in the graft copolymerization. Good thermal properties and high gloss when fabricated into films and molded objects also characterize the product of the invention.

According to studies made using the scanning electron microscope, the bulk graft copolymerization process of the invention provides a product having about 10 to about 30 microns particle size in which the rubber and graft copolymer disperse phase has about 0.1 to about 0.5 micron diameter. A graft polymer produced by a suspension process is rather poor in physical properties since, as is well known, the reaction takes place in a large suspension droplet resulting in a product with 80 to 150 microns particle size in which the rubber disperse phase has 1 to 10 microns diameter. Graft polymers made using the suspension process have poor physical properties such as excessive shrinkage, poor gloss and flexibility at high temperature as a result of the residual strain in the molded product resulting from poor interphase compatibilization or phase distribution.

It is the object of the bulk polymerization process of the invention to employ a reactive vinyl monomer or mixture of monomers such as vinyl chloride and a polyolefin dissolved, partially dissolved or dispersed in the vinyl chloride monomer which upon reaction forms a graft copolymer with the vinyl chloride monomer. The graft copolymer so formed acts to stabilize a portion of the vinyl chloride polymer which constitutes the disperse phase which is present and surrounded by the vinyl chloride monomer continuous phase during the initial stage of reaction. The product obtained is a fine powder. Thus, it is believed that by the use of this novel stabilization mechanism during the initial stage of the bulk polymerization process of the invention, improved physical properties are obtained in the graft polymers so formed which have superior properties in comparison with the graft polymers obtained by suspension polymerization processes.

While not desiring to be bound by theory, it appears that in the bulk polymerization process of the invention, graft copolymerization takes place in a non-aqueous emulsion droplet. Prior to reaction, the system containing vinyl chloride, trunk polyolefin or polyolefin copolymer and free radical initiator compound generally is or has the appearance of a clear solution. As soon as the reaction system is warmed up to initiate the reaction, the system becomes a milky emulsion. The similar appearance to that of a normal aqueous emulsion polymerization system persists during about one hour of the reaction period, and then the system becomes a thick paste. The thick paste subsequently becomes a fine nonviscous powder at about 40 percent conversion of monomer. The polyvinyl chloride initially formed is surrounded by a shell of polyvinyl chloride/polyolefin graft copolymer.

While the exact chemical nature of the polymer formed by the process of the present invention is not known, it is believed that a graft copolymer is formed in which the vinyl halide polymer forms upon the polyolefin polymer. To obtain a maximum reduction in melt viscosity which is a standard measure of processability, the polymer used as the trunk polymer in graft polymerization should be incompatible with the vinyl halide polymer formed. During the processing of a polymer of a vinyl halide such as in molding, the physical properties of the polymer change during the processing as the result of the polymer being held at high temperatures for long periods of combination with the internal heat built up as a result of shear forces produced by the processing machinery. Thus, the physical properties of a graft polymer having a trunk polymer which is compatible with the vinyl halide polymer can change during processing as the result of solubilization of the trunk polymer into the polyvinyl halide. In such a case, the impact strength would decrease during the processing. Therefore, the compositions of the present invention are directed to graft copolymers having a polyolefin backbone polymer which is incompatible with the vinyl halide polymer formed thereon. With such an incompatible polymer backbone, the physical properties of the graft copolymer do not change during processing, since the incompatibility prevents the solubilization of the trunk polymer in the polyvinyl halide. The melt viscosity is reduced by the choice of a graft copolymer and is not affected by the usual subsequent processing conditions.

The melt viscosity of the graft copolymer formed also depends upon the molecular weight of the trunk polymer, as well as the vinyl halide polymer formed thereon. A maximum reduction of melt viscosity can be expected from the graft copolymer where the trunk polymer is chosen so as to have low molecular weight and the vinyl halide monomer is polymerized so as to have a reasonably low molecular weight also. An ethylene-propylene diene modified polymer of 300,000 weight average molecular weight has been shown to be effective as well as similar polymers having low molecular weight in the range of 50,000 to 150,000 with the lower molecular weight olefin polymers being preferred for easy processing graft copolymers. Where maximum grafting efficiency during polymerization is desired, that is, where it is desirable to reduce the amount of free rubber remaining after polymerization, the molecular weight of the polyolefin trunk polymers such as ethylene-propylene rubber can be higher than 300,000 and can range up to 1,000,000 and higher and preferably is 300,000 to 500,000 in weight average molecular weight.

Suitable vinyl halide monomers useful in the invention are the alpha-halo-substituted ethylenically unsaturated compounds which are capable of entering into an addition polymerization reaction, for example vinyl monohalides such as vinyl fluoride, vinyl chloride, vinyl bromide, and vinyl iodide, as well as vinyl dihalides such as vinylidene fluoride, vinylidene chloride, vinylidene bromide, and vinylidene iodide and the like, although vinyl chloride is preferred. The polymers of the present invention can be formed of the same or different alpha-halo-substituted ethylenically unsaturated materials and, thus, the invention includes homopolymers, copolymers, terpolymers, and interpolymers formed by addition polymerization. Illustrative of these copolymers is a copolymer of vinyl chloride and vinylidene chloride.

While it is preferred that the monomer composition be comprised totally of vinyl halide monomer as described above, the present invention is also intended to include copolymers formed by the free-radical addition polymerization of a monomer composition containing a predominant amount, e.g., at least 50 percent of vinyl halide or a minor amount, e.g., up to 50 percent by weight of another ethylenically unsaturated monomer composition copolymerizable therewith. Preferably, the other ethylenically unsaturated monomer is used in amounts of 20 percent or less by weight and more preferably in amounts of 10 percent or less by weight of the total monomer used in preparing the polymer. Suitable ethylenically unsaturated compounds which can be used to form copolymers, terpolymers, interpolymers and the like, are illustrated by the following monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives, e.g., o-, m- or p-methyl, ethyl, propyl or butyl styrene; alphamethyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate and ethyl alpha-chloroacrylate, methyl alpha-chloroacrylate and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and alkyl alpha-cyanoacrylates, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, famaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl beta-chloroethyl sulfide vinyl beta-ethoxyethyl sulfide and the like can also be included as can diolefinically unsaturated hydrocarbons containing two olefinic groups in conjugated relation and the halogen derivates thereof, e.g., butadiene-1,3; 2-methyl-butadiene-1,3; 2,3-dimethylbutadiene-1,3; 2-methyl-butadiene-1,3 2,3-dimethyl-butadiene-1,3; 2-chloro-butadiene-1,3; 2,3-dichloro-butadiene-1,3; and 2-bromo-butadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinyklidene chloride and acrylate or methacrylate ester, vinyl chloride and/or vinylidene chloride and vinyl alkyl ether. These are given as illustrative of the numerous combinations of monomers possible for the formation of copolymers. The present invention includes all such combinations.

The free radical bulk polymerization of the monomer composition is conducted in the presence of an olefin homopolymer, copolymer or terpolymer. The olefin polymers can also contain an aliphatic hydrocarbon polyene, such as diene or triene, as a monomer unit. Generally polyenes of from 4 to 18 carbon atoms are employed.

Suitable olefin monomers are the aliphatic hydrocarbon olefins including ethylene, propene, butene-1, isobutene, pentene, hexene, heptane, octene, 2-methylpropene-1, 3-methylbutene-1, 4-methylpentene-1, 4-methylhexene-1, 5-methylhexene-1.

Suitable comonomers are those utilized to prepare homopolymers as listed above such as propene or butene-1 with ethene or isobutylene with isoprene and the like. Suitable termonomers are those utilized to prepare homopolymers and copolymers as disclosed above such as propene, ethene and the like containing up to 15 percent preferably up to about 6 percent by weight of polyene for example a diene such as dicyclopentadiene, 1,3-butadiene, cyclooctadiene, ethylidene-norborene, 1,4-hexadiene and other conjugated and especially non-conjugated dienes with linear or cyclic chains.

Trienes such as isopropylidene cyclopentadiene and the Diels-Alder mono- and di- adducts thereof with cyclopentadiene can be used in place of the diene.

The polyolefins used are characterized by being soluble, partially soluble or dispersible at polymerization temperature and pressure in vinyl chloride monomer, and if a homopolymer, having monomeric units with 2 to 8 carbon atoms and preferably 3 to 8 carbon atoms; if copolymers, having monomeric units with 2 to 8 carbon atoms. The weight average molecular weight of the olefin polymers, copolymers, and terpolymers can vary from about 50,000 to about 300,000 and higher, up to 1,000,000 and higher, preferably the olefin polymers have an apparent molecular weight as measured by solution viscosity of about 50,000 to about 200,000. The olefin polymer can be liquid or solid as desired. Where a maximum reduction in melt viscosity is desired in the polymer produced, the olefin polymer used is a low molecular weight rubbery material having a molecular weight of between about 80,000 and 150,000. Where maximum grafting efficiency during polymerization is desired, i.e., where only a slight amount of ungrafted olefin polymer is desired to be left in the graft polymer, a high molecular weight polyolefin is utilized having a weight average molecular weight of higher than about 300,000 and from about 300,000 up to 1,000,000 and higher and preferably, about 300,000 to 500,000.

The free radical bulk polymerization can take place in accordance with the process of the invention at temperatures between 25 and 90 degrees centigrade. The polymerization reaction is conducted in the presence of a free radical initiator compound. Useful free-radical initiator compounds are organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Azobisisobutyronitrile is particularly useful in the present invention. The initiator is used in concentration ranging from about 0.01 to about 1.0 percent by weight based on the total weight of the monomers. For use in bulk polymerization, the initiators which are soluble in the organic phase, such as benzoyl peroxide, diacetyl peroxide, azobisisobutyronitrile or diisopropyl peroxydicarbonate, dicyclohexylperoxydicarbonate, azobis(alpha-methyl-gamma-carboxybutyronitrile), caprylyl peroxide, lauroyl peroxide, azobisisobutyramidine hydrochloride, t-butyl peroxypivalate, 2,4-dichlorobenzoyl peroxide, azobis(alpha-gamma-dimethylvaleronitrile), and 2,2′-azobis(2,4-dimethyl valeronitrile) are generallly used. Preferably the initiator compound which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g. pinking.

The polymerization products of the present invention can be admixed with various conventional inert additives, such as fillers, dyes, and pigments. In addition, the polymerization products can be admixed with plasticizers, lubricants, thermostabilizers and ultraviolet light stabilizers as desired.

All other conditions and measures of the method of the invention are those conventionally employed in the previously known methods for the bulk polymerization of vinyl chloride involving two-stage polymerization as disclosed in British Pat. No. 1,047,489 and U.S. Pat. No. 3,522,227. In the following abbreviated description of the process, for the sake of simplicity, the initial stage of the polymerization or copolymerization will be referred to as first stage reaction and the vessel in which this initial stage of polymerization is carried out will be referred to as "Prepolymerizer.". The final or complementary stage of the polymerization will be called simply second stage reaction and the vessel in which it is carried out the "Polymerizer."

In the first stage reactor, the means chosen to agitate the monomer or monomers is of a type capable of providing high shear and is commonly referred to as a "radical turbine type" agitator. At the start of the first stage reaction, the Prepolymerizer is charged with a monomer composition to which a catalyst has been added. Any polymerization catalyst generally used in bulk polymerization methods, that is, those hereinabove described, can be used to an extent which is usual for bulk polymerization process. After addition of the vinyl chloride monomer to the first stage reactor, a small amount of monomer is vented in the process of removing the air from the first stage reactor vessel. The speed of the turbine type agitator generally lies between 500 and 2,000 revolutions per minute or a tip speed of about 2 to 7 meters per second in the first stage reactor. A tip speed of about 0.5 to about 2 meters per second is used in the second stage reactor. These figures should not be regarded as limiting values. As soon as a conversion of at least about 3 to about 20 percent of the monomer composition has been obtained in the first stage reactor, the contents of the vessel are transferred to a second stage polymerizer vessel equipped to provide slow speed, low shear agitation so as to insure proper temperature control of the reaction medium.

The reaction temperature in both first and second stage reactors generally ranges between about 25° C to about 90° C, preferably about 40° to about 80° C and especially about 50° to about 75° C. The reaction pressure in the first stage reactor generally ranges between about 130 pounds per square inch to about 210 pounds per square inch, preferably about 150 to about 190 pounds per square inch. The reaction pressure in the second stage reactor generally ranges between about 80 to about 120 pounds per square inch, preferably between about 90 to about 190 pounds per square inch. The optical microscope and sieve analysis were used as a method of determining average particle size. A magnification of 155 times was used together with an eye piece having a scale graduated in microns to determine the average particle size directly in microns. A 325 mesh screen having openings of 44 microns was used.

The molecular weight of the vinyl halide polymers of the invention is comparable to that of such polymers presently commercially produced by bulk polymerization which ranges from about 40,000 to about 125,000 by the weight average method. To determine molecular weight, relative solution viscosity, RSV, was measured in tetrahydrofuran at 25° C using a 1% resin solution. This is a slight modification from ASTM 1243A wherein a 1% resin solution in cyclohexanone is used. The polymers produced varied by this method between 1.6 and 2.7. Other test methods are described below.

A falling dart impact has been determined for polyvinyl chloride and related compositions using a falling dart appartus manufactured by Gardner Laboratory, Inc., Bethesda, Maryland. The apparatus consists of a 4-pound weight or dart with a rounded end of ½ inch diameter. The dart is allowed to fall through a guiding cylinder and to strike a sample which is held on a flat surface over a ⅝ inch diameter opening which is ¼ inch deep. The guiding cylinder is calibrated in inches, the impact transmitted to the sample being dependent on the height of the fall of the dart. The height of fall in feet times the dart weight (4 pounds) gives an impact in ft.-lb. units.

The sample for the test must be at least ½ inch wide but preferably 1 inch or wider. A thickness of ⅛ inch is desirable. The dart is allowed to fall on a sample from a given height. If the sample survives the impact without showing signs of breaking, cutting, or cracking (it may stretch or distort), it is recorded as passing that impact. Higher falls of the darts are carried out until a failure is recorded. The impact strength is given as the highest pass. This apparatus measures impact strength up to 14 ft.-lb.

Izod Impact (notched) was measured following the procedure of ASTM D256. Heat distortion temperature was measured by ASTM D-648 at 264 psi.

The melt viscosity was measured at 400° F/63 rpm using the Brabender Plasticorder. Fifty-five grams of sample containing 2 parts per hundred grams resin of a tin stabilizer sold under the trademark "Thermolite T-31" were charged into the Brabender chamber which was kept at 400° F/63 rpm. After reaching the fusion point, the sample reaches an equilibrium torque. The equilibrium torque expressed in meter-grams (m-g) corresponds to the melt viscosity.

In order to further illustrate this invention but without being limited thereto, the following examples are given. In this specification and claims, all parts and percentages are by weight, all pressures are gauge pressures, and all temperatures are in degrees centigrade unless otherwise specified.

EXAMPLE 1

In a vertical type first stage reactor of two and one-half gallon capacity and stainless steel construction, equipped with a radial turbine-type agitator were added 52 grams of an ethylene propylene diene-modified terpolymer (EPDM) of 160,000 weight average molecular weight. The EPDM polymer having an ethylene/propylene ratio of 55/45 and ethylidene norbornene present as the diene in an amount of 3 ± 0.5 percent. Next were added 0.77 milliliter of a 29 percent solution of acetyl cyclohexane sulfonyl peroxide in dimethyl phthalate sold under the trademark "Lupersol 228P", 2.5 milliliters of a 40 percent solution of di-2-ethyl hexyl peroxy dicarbonate in mineral spirits, sold under the trademark "Lupersol 223M" and 11 pounds of vinyl chloride monomer. To remove air from the reactor, 1.5 pounds of the vinyl chloride monomer were vented from the reactor. The mixture in the reactor was slowly raised in temperature while agitating using a radial turbine type agitator operated at a speed of 2,000 revolutions per minute. A temperature of 67° C. was reached, after a heating period of one hour and twenty minutes. The temperature was maintained for a period of 15 minutes at a reaction pressure of 167 pounds per square inch.

The mixture was then transferred to a five-gallon stainless steel reaction vessel containing 5.8 milliliters of "Lupersol 228P" and 1 gram of lauroyl peroxide, together with an additional monomer charge of 6 pounds of vinyl chloride, of which 1 pound was vented in order to clear the air from the reactor. The mixture was heated to a jacket temperature of 47° C. and the pressure raised to 104 pounds per square inch. These conditions were maintained over a period of 7 hours. The monomer that is not reacted is blown off and is collected in a condensing circuit, incorporating a filter so as to separate any particles of polymer carried over. The final traces of residual monomer absorbed by the particles of polymer are eliminated by placing the polymerizer under vacuum twice in succession and changing over to a nitrogen atmosphere in between. All the polymer composition is then passed through screening equipment. In this way, a powdery polymer is obtained in a yield of 75 percent by weight based upon the weight of the monomer available for polymerization. The polymer has an average particle size of 29 microns by photomicroscope. Screening analysis of the product is as follows:

| | |
|---|---|
| Scale | 0.0 lbs. |
| Lumps | 0.13 lbs. (1 percent) |
| Particles Greater than 10 mesh | 0.43 lbs. (7 percent) |
| Particles Greater than 20 mesh | 1.6 lbs. (12.05 percent) |
| Particles Greater than 40 mesh | 0.6 lbs. (4.52 percent) |
| Particles Greater than 70 mesh | 0.2 lbs. (1.5 percent) |
| Particles Less than 70 mesh | 9.81 lbs. (73.9 percent) |

EXAMPLE 2 — CONTROL

For purposes of comparison only a polyvinyl chloride homopolymer was prepared using identical proportions and conditions as described above, with the exception of the omission of the ethylene propylene diene modified terpolymer. The polymer obtained in 63 percent yield had an average particle size of 105 microns as judged by the fact that 50 percent of the polymer produced passed through a 105 micron screen. Less than 1 percent of the polymer passes through a 44 micron screen. The total product contained 5 percent lump. Four percent scale formation reduced the useful yield. Relative viscosity was 2.56. The product had a glass transition temperature of 75° C., a heat distortion temperature of 66° C., and an Izod impact strength in foot pound per inch of 0.8 (notched).

EXAMPLE 3

A bulk polymerized polyvinyl chloride graft copolymer was made by the process of this invention using the same ingredients and proportions as in Example 1, except that 7.6 percent of an ethylene propylene diene modified terpolymer (EPDM) was used based on the amount of monomer used in the first stage. The EPDM used having an ethylene/propylene ratio of 55/45 and containing 1,4-hexadiene as the diene present in an amount of 3 ± 0.5 percent.

In this example, the EPDM was dissolved in monomer at 60° centigrade over a period of 1 hour. The polymerization vessel was pressurized with 2 atmospheres of nitrogen prior to heating to initiate reaction. Both the first stage polymerization conducted at 150 pounds per square inch gauge over a period of 15 minutes and the second stage polymerization conducted at a pressure of 130 pounds per square inch gauge over a period of 5 hours were run with 2 atmospheres of nitrogen pressure added prior to reaction. The weight average molecular weight of the terpolymer was 204,000. A powdery polymer was obtained in a yield of 80 percent having 6 percent of the EPDM in the final product as determined by chlorine analysis. The product had a glass transition temperature of 72° C., a heat distortion temperature of 64.8° C., and an Izod impact strength in foot pounds per inch of 18.0 (notched). A polyvinyl chloride homopolymer control prepared in the absence of rubber, resulted in 0.8 ft. lb/in (notched) Izod impact strength and a heat distortion temperature of 65° C.

It was found that the polyolefin grafted polyvinyl chloride (PVC) is insoluble in dimethyl formamide (DMF) while ungrafted PVC is quite soluble in the same solvent. On the other hand, the polyolefin such as EPDM or EPR is insoluble in DMF but soluble in hydrocarbons such as n-heptane. Since the product is completely soluble in tetrahydrofuran (THF), it contains no gel fraction. Therefore, a mixed solvent of DMF n-heptane was used for the separation of reaction product. By shaking the reaction product in the above mixed solvents at 60° C. for several hours, free PVC dissolves in DMF and free polyolefin dissolves in the n-heptane layer while polyolefin grafted PVC stays in the middle of the two layers. The lower layer of DMF solution was separated to recover free PVC and the upper layer of n-heptane solution was separated to recover the polyolefin. The middle layer containing polyolefin grafted PVC was shaken again with fresh DMF n-heptane to remove a trace amount of free PVC and polyolefin. The fractionation was repeated several times and each fraction was recovered after stripping off the solvent. The composition of the fraction was determined by chlorine, carbon and hydrogen analysis.

According to this fractionation, the product of Example 3 contains 89.5% free PVC (soluble in DMF), 2.5% free EPDM (soluble in n-heptane) and 8% of PVC-EPDM graft (56 percent PVC and 44 percent EPDM).

EXAMPLE 4

A bulk polymerized polyvinyl chloride graft copolymer was made by the process of the invention, using the same proportions of ingredients as in Example 3 but using 9.7 percent of the ethylene propylene ethylidene norbornene terpolymer with a weight average molecular weight of 160,000. A conversion of 57 percent was obtained with 10.5 percent of EPDM contained in the product. Heat distortion temperature was 62.6° C. The impact strength as measured by the Izod method in foot pounds per inch was 17.5.

EXAMPLE 5

Vinyl chloride was bulk polymerized so as to graft vinyl chloride onto an ethylene propylene diene modified rubber containing 3 ± 0.5 percent 1,4-hexadiene and a molecular weight of 204,000 by the following procedure: Into an autoclave, 200 milliliters of vinyl chloride were added, together with 2 grams of ethylene propylene diene modified polymer as described in Example 1. The contents of the autoclave were heated to 40° C. under a pressure of 5 atmospheres in order to dissolve the ethylene propylene diene modified rubber in the vinyl chloride monomer. The contents of the autoclave were then cooled to 6° C. and the pressure dropped to 1 ½ atmospheres and an additional 300 milliliters of vinyl chloride were added, together with 0.15 milliliters of acteyl cyclohexane sulfonyl peroxide (29 percent solution) in dimethyl phthalate and 0.06 milliliters of a 40 percent solution of di-2-ethyl hexyl peroxy dicarbonate in mineral spirits. The temperature was slowly raised to 60° C. over a period of 1 hour and held at this temperature for a period of 3 hours, while agitating using a high speed agitator rotating at 450 rpm. The sample was then cooled to 35° C. and the polymer obtained was washed with normal hexane and dried at 50° C. in a vacuum oven. An average particle size of less than 10 microns was obtained as determined by photomicroscopic analysis of the powdery polymer product. The product was obtained in a yield of 37 percent.

EXAMPLE 6

Into a one-liter glass autoclave equipped with a magnetic driven agitator having a spiral type stirring blade and a thermocouple, were added 20 g. ethylene-propylene rubber containing 55% ethylene of 76,700 weight average molecular weight and 270 g. vinyl chloride monomer. About 20 g. vinyl chloride were vented to remove air from the reactor. The pressure of the reactor was adjusted to 2.5 atmospheres pressure by introducing nitrogen gas. The reactor was heated to 60° C. while stirring and the rubber was dissolved within half an hour. The rubber solution was cooled down to 25° C. and then an additional 250 g. vinyl chloride were introduced in the reactor along with 0.03 ml. Lupersol 228P and 0.3 g. of 75% t-butylperoxypivalate solution in mineral spirits which is sold under the trademark "Lupersol 11". Twenty grams of vinyl chloride were vented to remove air and the pressure was adjusted to 2.5 atmospheres pressure by introducing nitrogen. The reaction mixture was heated to 65° C. while stirring. The reaction was carried out at 65° C. and 143 psig for 5 hours while stirring at 450 rpm.

At the end of the reaction period, the reaction mixture was cooled down to room temperature, the pressure was released and then 300 ml. methanol containing 0.5 g. di-t-butyl-p-cresol was introduced. After stirring for 15 minutes, the reactor was opened up. The reaction mixture was filtered and the white powder reaction product was dried in vacuo overnight at 50° C. The reaction product contained no scale resin. It weighed 300 g. indicating 60 percent yield. The chlorine analysis indicated 6.7 percent ethylene-propylene rubber content.

The reaction product was fractionated by DMF/n-heptane mixture solvent as in Example 3 and 89.9% DMF soluble portion was found (free PVC), 3.5% n-heptane soluble portion (free rubber) and 6.6% rubber-graft-PVC containing 53% PVC backbone.

EXAMPLE 7

A bulk polymerized polyvinyl chloride graft copolymer was made by the same procedure and with the same proportion of ingredients as in Example 6, except that an ethylene-propylene rubber with 158,000 weight average molecular weight was used.

A powdery polymer containing no scale resin was obtained in 65% yield having 6.1% of the rubber in the final product as determined by chlorine analysis. The reaction product was fractionated by DMF/n-heptane mixture solvents as in Example 3 and resulted in 89.5% DMF soluble portion as free PVC, 3.4% n-heptane soluble portion as free rubber and 7.1% the rubber-graft-PVC containing 62% PVC backbone.

EXAMPLE 8

A bulk polymerized polyvinyl chloride graft copolymer was made by the same procedure and with the same proportion of ingredients as in Example 6, except that the ethylene-propylene rubber was replaced by 25 g. ethylene-propylene-1,4-hexadiene modified terpolymer containing 3 ± 0.5 percent diene with 131,000 weight average molecular weight. The reaction was carried out at 75° C. for 5 hours.

A powdery polymer containing no scale resin was obtained in 56% yield having 9.0% rubber content in the final product as determined by the chlorine analysis. The reaction product was fractionated by DMF/n-heptane as in Example 3 and resulted in 86% DMF soluble parts as free PVC, 4% n-heptane soluble parts as free EPDM rubber and 10% EPDM-graft-PVC containing 50% PVC backbone.

EXAMPLE 9

A bulk polymerized polyvinyl chloride graft copolymer was made by the same procedure and with the same proportion of ingredients as in Example 6, except that 25 g. ethylene-propylene rubber were used instead of 20 g. The reaction was carried out at 75° C for 5 hours.

A powdery polymer containing no scale resin was obtained in 57% yield having 8.6% rubber content as determined by the chlorine analysis.

EXAMPLE 10

A bulk polymerized polyvinyl chloride graft copolymer was made by the same procedure and with the same proportion of ingredients as in Example 7, except that 25 g. ethylene-propylene rubber were used instead of 20 g. The reaction was carried out at 75° C. for 5 hours.

A powdery polymer containing no scale resin was obtained in 60% yield and had 8.1% rubber content as determined by chlorine analysis.

EXAMPLE 11

A bulk polymerized polyvinyl chloride graft copolymer was made by the same procedure and with the same proportion of ingredients as in Example 8, except that the EPDM polymer used was ethylene-propylene-ethylidene norbornene terpolymer of 71,700 weight average molecular weight and containing 3 ± 0.5 percent norbornene. An additional 0.2 g. lauroyl peroxide was used as a third free radical catalyst.

A powdery polymer containing no scale resin was obtained in 66% yield having 7.4% EPDM content as determined by chlorine analysis

EXAMPLE 12

A bulk polymerized polyvinyl chloride graft copolymer was made by the same procedure and with the same proportion of ingredients as in Example 8, except that the EPDM was replaced by the same amount of amorphous polypropylene of 31,900 weight average molecular weight which is sold under the trademark "Eastbond M-5W".

A fine powdery polymer containing no scale resin was obtained in 54 percent yield having 8.6 percent trunk polymer as determined by the chlorine analysis.

EXAMPLE 13

Vinyl chloride was graft copolymerized by the same procedure and with the same proportions of ingredients as in Example 5 except that 4 percent of a butene-1 ethylene copolymer containing 5% ethylene was substituted for the polymer used in Example 5. In addition to the same proportion of the free radical catalysts used in Example 5, 0.5 g. of 2,2'-azobis(2,4-dimethyl valeronitrile) was used. A yield after 3 hours reaction period of 50.5 percent was obtained. The glass transition temperature was 76° C.

EXAMPLE 14

One gram each of resin obtained in Example 6 through 13 and several PVC homopolymers were dissolved in THF and was made up to 100 ml solution. The relative viscosity of each solution was measured at 25° C.

One hundred parts of each resin obtained in Example 6 through Example 12 and several PVC homopolymers were mixed with 2 parts of tin stabilizer sold under the trademark "Thermolite T-31" and the equilibrium melt viscosity was measured using Brabender Plasticorder as described before. Since the amount of work necessary to process the product increases as the molecular weight of the product increases, the equilibrium torques should be compared with each other based on the relative viscosity which is a measure of molecular weight.

One hundred parts of each resin obtained in Example 6 through Example 12 and several PVC homopolymers were mixed with 2 parts of tin stabilizer sold under the trademark "Thermolite T-31" and molded at 400° F. to obtain a resin sheet with ⅛ inch thickness. Using this resin sheet, the falling dart impact strength was measured.

Thus, in the following Table I, the relative viscosity, the equilibrium torque and the falling dart impact strength were summarized to compare with those of vinyl chloride homopolymers. It is clearly demonstrated that the graft PVC obtained in this invention exhibits a great improvement in impact strength and melt viscosity (processability) over the homopolymer of vinyl chloride. For example, the product of Example 8 can be compared with vinyl chloride homopolymer with either 2.11 or 1.94 relative viscosity. The impact strength of the product is improved more than 10 times and the melt viscosity is decreased by 38% or 10%, respectively.

TABLE I

| The Product of Example | Trunk Polymer | % | Relative Solution Viscosity | Melt Viscosity Equilibrium Torque m-g | Falling Dart Impact ft-lb. |
|---|---|---|---|---|---|
| 6 | EPR | 6.7 | 2.08 | 1280 | 4.0 |
| 7 | EPR | 6.1 | 2.19 | 1595 | >14 |
| 8 | EPDM | 9.0 | 2.00 | 935 | >14 |
| 9 | EPR | 8.8 | 1.84 | 800 | 8.3 |
| 10 | EPR | 8.5 | 1.93 | 846 | >14 |
| 11 | EPDM | 7.4 | 2.02 | 821 | 6.0 |
| 12 | PP | 9.0 | 1.72 | 325 | — |
| Vinyl Chloride Homopolymer | | | | | |
| A | — | | 1.87 | 860 | 1.3 |
| B | — | | 1.94 | 1045 | 1.3 |
| C | — | | 2.11 | 1518 | 1.2 |
| D | — | | 2.48 | 1700 | 0.8 |

EXAMPLE 15

The procedure and proportions of Example 6 was followed in order to prepare an improved polyvinyl chloride containing an olefin graft copolymer. Into the autoclave were added 6.6% of an ethylene propylene rubber having a percent mole ratio of 60 ethylene to 40 propylene and a molecular weight of 661,000 by the weight average molecular weight method. The autoclave also contains 0.11% lauroyl peroxide and 0.05% benzoyl peroxide in addition to vinyl chloride and ethylene propylene rubber. These proportions of polymerization catalysts are based upon monomer. The reaction was carried out without any attempt to predisperse the rubber in the vinyl chloride monomer at a temperature of 60° C but with stirring over period of 5 hours to obtain a conversion of 48%.

The reaction product was fractionated by the use of DMF/n-heptane mixture solvent as in Example 3 and there was found that 92% of the rubber out of the total rubber initially charged had reacted to form a graft copolymer.

EXAMPLE 16

Using the same procedure and proportions of ingredients as in Example 16, a bulk polymerized polyvinyl chloride containing a graft copolymer was made using an ethylene propylene rubber containing 60% ethylene and 40% propylene on a mole percent basis. The ethylene propylene rubber was used in the amount of 5.4% based upon the total monomer and had a molecular weight of 740,000, based upon a weight average method of determination.

The reaction product was fractionated as in Example 16 and it was found that 92% of the rubber out of the total rubber initially charged had reacted to form a graft copolymer.

EXAMPLE 17

In accord with the procedure of the invention, a two liter glass autoclave equipped with a pressure sensor and a breaker bar agitator was charged with 45 g. of a proprietary ethylene-propylene-hexadiene terpolymer rubber; (Nordel 1040 having weight average molecular weight of about 204,000, manufactured by E. I. DuPont de Nemours and Co.) and 1.0 g. of lauroyl peroxide initiator. The reaction vessel was checked for leaks by pressurization with nitrogen, evacuated to a subatmospheric pressure of about 20 m.m. and charged with 765 g. of vinyl chloride monomer. After the reaction vessel had been sealed, about 45 g. of the vinyl chloride was vented from the vessel to remove entrapped air, thereby providing a net charge of vinyl chloride monomer of about 720 g. Over a period of about 45 minutes the reaction mass was heated with agitation to a temperature of about 70° to 72° under a pressure of about 170 to 175 p.s.i.g. to initiate polymerization during which period the rubber dissolved substantially completely in the liquid monomer. The reaction was allowed to proceed under the latter conditions of temperature and pressure for about 3.1 hours. The polymerization vessel was cooled to room temperature and the residual vinyl chloride monomer was vented from the reaction vessel. The particulate product in the reaction vessel and product scraped from the bottom and walls of the reaction vessel were combined and dried at about 80° for four hours at 20 mm. pressure. There was thus obtained a total yield of 457 g. of bulk polymer product of which the total rubber content, i.e. rubber in both free and graft form, computed as weight percent of rubber based on weight of polymer product, was about 9.9%. Analysis of the polymer product by an extraction procedure substantially similar to that described in Example 3 above indicated that the product contained about 3.4 weight percent free rubber and about 8.5 weight percent graft polymer. About 74 weight percent of the product was so finely divided as to pass through 10 mesh screen (U.S. Seive Series). The polyvinyl chloride portion of the product was 412 g. corresponding to a conversion of about 57% based on the net amount of vinyl chloride monomer charged.

EXAMPLE 18

Additional polymer product was prepared by a procedure substantially similar to that of Example 17 above. The percent conversion of vinyl chloride was about 66% and the total rubber in the product was about 8.7%. Extraction analysis of the product indicated that the product contained about 2.5 weight percent free rubber and about 8.6 weight percent graft polymer. About 74 weight percent of the polymer product passed through a 10 mesh screen.

EXAMPLE 19

Additional polymer product was prepared by a procedure substantially similar to that of Example 17 above. The percent conversion of vinyl chloride was about 61% and the total rubber in the product was about 9.4%. Extraction analysis of the polymer product indicated that the production contained about 2.8 weight percent free rubber and about 8.6 weight percent graft polymer. About 76 weight percent of the product passed through a 10 mesh screen.

EXAMPLE 20

Equal weight samples of each of the bulk polymer products of Examples 17–19 above were pressed into thin film discs on a Carver press at about 350° F. at 10,000 p.s.i. pressure employing a 30 second pressing time. The films prepared were glossy, of smooth, surface, and continuous in nature, i.e. free of voids or holes.

The smoothness, glossiness and continuity of the film samples is attributable to an enhanced flow capability of the bulk products at the elevated processing temperature.

EXAMPLE 21

The resins of Examples 18 and 19 were tested for milling characteristics by working mixtures containing about 113 g. of resin with about 2 parts per hundred parts of resin of the Thermolite T-31 tin stabilizer described on page 20 above in an Amil mill operating with a front roll temperature of 360° F and a back or drive roll temperature of about 370° F. During the milling of each mixture the fusion time of each mixture, the appearance of the mill bank, the tear strength of the mixture in the mill, the visual appearance of the milled product and duration of the milling operation required to provide adequate, uniform blending of the polymer components as well as uniform blending of the stabilizer with the polymer were noted are presented in Table II below.

TABLE II

| | Product of | |
|---|---|---|
| | Example 18 | Example 19 |
| Fusion Time | 45 seconds | 46 seconds |
| Mill Bank | good | fair |
| Tear Strength | good | fair |
| Overall Duration of milling (includes fusion time | 5 minutes, 45 seconds | 5 minutes, 46 seconds |
| Appearance of Milled Product | yellow opaque plaque with slight sinking around edges | white opaque plaque with slight sinking around edges |

The results of Table II indicate the good processing characteristics of the product of the invention and, in the observed fusion times, further substantiate the good elevated temperature flow property of the product of the invention.

The milled product mixtures obtained in the above milling experiment were pressed in a Carver press at about 100 psi for about 3 minutes at about 370° F, then at about 30,000 to 32,000 psi for about 2 minutes at the latter temperature and finally at about 30,000 to 32,000 psi while cooling the pressed samples to ambient temperature. The resultant molded polymer samples were reserved for testing of polymer impact strength as described in Examples 22 and 23 herein below, with the samples for Example 22 being cut into bars.

EXAMPLE 22

Bar samples of the polymers of Examples 18 and 19 which were milled, molded and cut as described in Example 21 above and which have substantially the same dimensions were tested for impact resistance to the same impact force according to the Notched Izod impact test (ASTM D-256) at ambient, i.e. room, temperature and additionally at minus 29° in the case of the Example 18 product. The results of each of these tests are set forth in Table III below with each test result being the average of six duplicate runs for the ambient temperature tests and of four duplicate runs for the low temperature tests, the range of individual runs being indicated in parenthesis following each average result.

TABLE III

| | Notched Izod Impact Strength (ft-lbs per inch) | | | | | |
|---|---|---|---|---|---|---|
| | Test at Ambient Temperature | | | Test at −29° | | |
| Sample Bars Containing: | Impact Resistance (ft-lbs per inch) | Nature of Break | Whitening at Break Edges | Impact Resistance (ft-lbs per inch) | Nature of Break | Whitening at Break Edges |
| Polymer of Example 18 | 12.0 (9.9 – 13.0) | hinged break | substantial | 0.85 (0.76 – 1.12) | complete break | nil |
| Polymer of Example 19 | 9.8 (8.0 – 11.1) | hinged break | substantial | | | |

The results presented in Table III illustrate the excellent impact resistance of polymers of the invention especially at ambient temperature. Moreover the obtainment at ambient temperature of whitening at the breaks with incomplete breakage, i.e. obtainment of a hinged break, indicates that at ambient temperature the present polymers undergo Izod impact breakage by ductile failure or rupture rather than by brittle failure or rupture (as would be indicated by absence of whitening at the edges of the break and complete breakage of the sample). Comparison of the Table III test results also indicates that the temperature at which the samples are broken affects the kind of breakage obtained, i.e. ductile or brittle, in the case of the present polymer samples. Thus, whitening at the breaks with hinged breakage in the case of the polymer sample, broken at ambient temperature, as compared to the non-whitening at the breaks with complete breakage corresponding polymer sample broken at −29° indicate that the present polymer product sample undergoes ductile breakage at the higher breakage temperature but brittle failure or breakage at the lower breakage temperature.

EXAMPLE 23

Molded samples of the polymers of Examples 18 and 19 which were prepared under the milling and pressing conditions as described in Example 21 above and which have substantially the same dimensions were compared for impact resistance as measured according to the falling dart impact tests, described hereinabove, using dart drop height of 3.33 feet and a dart of 4 lbs. weight to provide a standard impact of 13.3 ft-lbs. The tests were carried out with the test samples at ambient temperature and at about 0°.

Both polymers passed the test, i.e. did not shatter, at both 0° and ambient temperature.

While this invention has been described with reference to certain specific embodiments, it will be recognized by those skilled in the art that many variations are possible without departing from the spirit and scope of the invention.

What is claimed is:

1. In a process for the preparation of a vinyl chloride polymer comprising polymerizing in bulk in liquid phase in the presence of a trunk polymer and a free radical initiator compound for said polymerization, a vinyl halide monomer either alone or in combination with up to 50% by weight based on the total weight of monomer, of another ethylenically unsaturated monomer copolymerizable therewith, the improvement which comprises carrying out the polymerization in the presence of about 0.05% to about 20% by weight, based upon said vinyl halide monomer, of a trunk polymer consisting essentially of an olefin trunk polymer of at least two aliphatic hydrocarbon olefin monomers of 2 to 8 carbon atoms and no more than 15% by weight, based on the weight of said olefin polymer of an aliphatic hydrocarbon non-conjugated polyene of 4 to 18 carbon atoms, said olefin polymer being soluble, partially soluble, or dispersible in said monomer or monomers, and said olefin polymer having a weight average molecular weight of about 50,000 to about 1,000,000.

2. The process of claim 1 wherein said vinyl halide is vinyl chloride and wherein said olefin polymer an olefin terpolymer.

3. The process of claim 2 wherein said olefin terpolymer contains a diene as the polyene.

4. The process of claim 3 wherein said diene is present in said terpolymer in the proportion of up to about 6% by weight of said terpolymer.

5. The process of claim 3 wherein said olefin terpolymer is an ethylene propylene diene modified terpolymer.

6. The process of claim 4 wherein said olefin polymer is ethylene-propylene ethylidene norbornene terpolymer.

7. The process of claim 4 wherein said olefin polymer is ethylene-propylene 1,4-hexadiene terpolymer.

8. The process of claim 1 comprising polymerization in two stages in which during a first stage the reaction mixture is subjected to high speed agitation until about 3% to about 15% by weight of said monomer or monomers have been converted to polymer and further polymerizing the resultant reaction mixture together with additional monomer or monomers in a second stage during which the reaction mixture is subjected to low speed agitation until the polymerization has been completed.

9. The process of claim 1 for producing a bulk polymerized product wherein lump formation is reduced and scale build-up is eliminated by:
  1. preparing a mixture by incorporating the olefin polymer in the vinyl halide monomer in the amount of from about 0.05% to about 20% by weight of said monomer and
  2. bulk polymerizing said mixture.

10. The process of claim 9 wherein said olefin polymer has a weight average molecular weight of about 50,000 to 300,000.

11. The process of claim 9 wherein said olefin polymer is an ethylene-propylene diene-modified terpolymer.

12. The process of claim 9 comprising polymerization in two stages in which during a first stage the reaction mixture is subjected to high speed agitation until about 3% to about 15% by weight of said monomer or monomers have been converted to polymer and further polymerizing the resultant reaction mixture together with additional polymer monomer or monomers in a second stage during which the reaction mixture is subjected to low speed agitation until the polymerization has been completed.

13. In the process for preparation of a vinyl chloride polymer comprising polymerizing in bulk in liquid phase in two stages in the presence of a trunk polymer and a free radical initiator compound for the polymerization, a vinyl chloride monomer, either alone or in combination with up to 50% by weight based on the total weight of monomer of another ethylenically unsaturated monomer copolymerizable therewith, the improvement of carrying out said polymerization in the presence of about 0.05% to about 20% by weight, based upon said vinyl chloride monomer, of a trunk polymer consisting essentially of an ethylene-propylene diene-modified terpolymer which is soluble, partially soluble or dispersible in said monomer or monomers, which has a weight average molecular weight of about 50,000 to 1,000,000, and wherein the diene is a non-conjugated diene present in an amount no more than 15% by weight, based on the weight of said terpolymer.

14. The process of claim 1 wherein the weight average molecular weight of said olefin polymer is about 50,000 to 300,000.

15. The process of claim 13 wherein the weight average molecular weight of said trunk polymer is about 50,000 to 300,000.

16. In the polymer product of a composition comprising a vinyl chloride monomer, either alone or in combination with up to 50% by weight based on the total weight of monomer, of another ethylenically unsaturated monomer copolymerizable therewith, and a trunk polymer, polymerized in bulk in liquid phase in the presence of a free radical initiator compound for the polymerization reaction, the improvement wherein said trunk polymer consists essentially of an olefin trunk polymer of at least two aliphatic hydrocarbon olefin monomers of 2 to 8 carbon atoms and no more than 15% by weight, based on the weight of said olefin polymer, of an aliphatic hydrocarbon non-conjugated polyene of 4 to 18 carbon atoms, said olefin polymer having a weight average molecular weight of about 50,000 to 1,000,000, the proportion of olefin polymer in said product being about 0.05% to about 20% by weight based on vinyl halide monomer units thereof.

17. The product of claim 16 wherein said olefin polymer is a terpolymer containing a diene as the polyene.

18. The product of claim 17 wherein said olefin polymer is ethylene-propylene diene-modified rubber.

19. The product of claim 16 wherein the proportion of olefin polymer in the product is about 0.1% to about 10% by weight based on vinyl halide monomer units thereof.

20. In the polymer product of a composition comprising a vinyl chloride monomer and a trunk polymer, polymerized in bulk liquid phase in the presence of a free radical initiator compound for the polymerization reaction, the improvement wherein said trunk polymer consists essentially of an olefin trunk polymer of at least two aliphatic hydrocarbon olefin monomers of 2 to 8 carbon atoms and no more than 15% by weight, based on the weight of said olefin polymer of an aliphatic hydrocarbon non-conjugated polyene of 4 to 18 carbon atoms, said olefin polymer having a weight average molecular weight of about 50,000 to 1,000,000 and being present as a rubber and graft polymer disperse phase having a particle diameter of about 0.1 to about 0.5 microns, the proportion of olefin polymer in said product being about 1% to about 20% by weight based on vinyl halide monomer units thereof to impart high impact strength to said product.

21. The product of claim 20 wherein the proportion of olefin polymer is about 1% to about 10% be weight.

22. The product of claim 20 wherein the vinyl halide monomer is vinyl chloride.

23. A high impact strength two stage bulk polymerized product according to claim 20.

24. The product of claim 20 wherein said olefin polymer is ethylenepropylene diene-modified rubber.

25. The product of claim 20 wherein the weight average molecular weight of said olefin polymer is about 50,000 to 300,000.

26. The polymer product of the process of claim 6.

27. The polymer product of the process of claim 9.

28. The polymer product of the process of claim 14.

* * * * *

UNITED STATES PATENT OFFICE
CERTIFICATE OF CORRECTION

Patent No. 4071582　　　　　　　　　Dated January 31, 1978

Inventor(s) Akio Takahashi

It is certified that error appears in the above-identified patent and that said Letters Patent are hereby corrected as shown below:

Col. 7, lines 49-50, delete "methyl alpha chloroacrylate and ethyl alpha-chloroacrylate".

Col. 7, lines 53-55, delete "alkyl alpha cyanoacrylates, e.g. methyl alpha-cyanoacrylate and ethyl alpha cyanoacrylate".

Col. 8, lines 5-7, delete "vinyl propyl ether, vinyl n-butyl ether, vinyl isobutyl ether, vinyl 2-ethylhexyl ether, vinyl 2-chloroethyl ether".

Col. 8, lines 14-15, delete "2-methyl-butadiene-1,3, 2,3-dimethyl-butadiene-1,3".

Col. 17, line 4, after "Example" delete "16" and insert therefor ---15---.

Col. 17, lines 12-13, after "Example" delete "16" and insert therefor ---15---.

UNITED STATES PATENT OFFICE
CERTIFICATE OF CORRECTION

Patent No. 4071582         Dated January 31, 1978

Inventor(s) Akio Takahashi

It is certified that error appears in the above-identified patent and that said Letters Patent are hereby corrected as shown below:

Col. 18, line 10, delete "production" and insert therefor ---product---.

Col. 20, line 8, after "vinyl" delete "halide" and insert therefor ---chloride---.

Col. 20, line 14, after "vinyl" delete "halide" and insert therefor ---chloride---.

Col. 20, lines 35-36, delete "wherein said vinyl halide is vinyl chloride and".

Col. 20, line 65, after "vinyl" delete "halide" and insert therefor ---chloride---.

Col. 21, line 13, delete "polymer".

Signed and Sealed this

Twenty-fifth Day of November 1980

[SEAL]

Attest:

SIDNEY A. DIAMOND

Attesting Officer

Commissioner of Patents and Trademarks